United States Patent Office 3,484,418
Patented Dec. 16, 1969

3,484,418
DITHIOLS OF POLY(THIOETHERS)
Edwin J. Vandenberg, Foulk Woods, Del., assignor to Hercules Incorporated, Wilmington, Del., a corporation of Delaware
No Drawing. Continuation-in-part of application Ser. No. 500,355, Oct. 21, 1965, which is a continuation-in-part of application Ser. No. 298,434, July 29, 1963. This application Dec. 8, 1967, Ser. No. 688,964
Int. Cl. C08g 23/00
U.S. Cl. 260—79
8 Claims

ABSTRACT OF THE DISCLOSURE

Low molecular weight (number average of 1–20 thousand) polythioethers having a thiol group at each end of the polymer chain, as for example, dithiols of poly(propylene sulfide), poly(trimethylene sulfide), poly(2-butene episulfiide) are described.

---

This application is a continuation-in-part of my copending application Ser. No. 500,355, filed Oct. 21, 1965, now abandoned, which is in turn a continuation-in-part of my application Ser. No. 298,434, filed July 29, 1963, now U.S. 3,337,487.

This invention relates to new terminally reactive polymers, and more particularly to dithiol-ended polythioethers.

It has previously been discovered that linear high molecular weight polythioethers can be prepared by the polymerization of episulfide monomers by means of certain organometallic compounds. However, these polymers contain at best no more than one active hydrogen end group per molecule. In high molecular weight polymers, this amount of active hydrogen concentration is so low as to be essentially ineffective as a means of modifying the polymer. Polymers having increased active hydrogen contents, and particularly having active-hydrogen on each end of the polymer chain, have greatly enhanced utility.

Now, in accordance with this invention, it has been found that new polythioethers having a terminal thiol-group at each end of the polymer chain can be produced by cleavage of these high molecular weight polythioethers. The new thiol-ended polythioethers of this invention may be defined as dithiols of polythioethers wherein each of the thiol groups is terminal. These new dithiols have a number average molecular weight from about 1,000 to about 20,000. The new dithiols of this invention can be crystalline or amorphous. Certain of the dithiols of this invention are solid polymers and other are liquids, depending on their molecular weights. The dithiols of this invention have the formula:

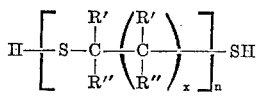

where each R' is any one of hydrogen, alkyl, alkenyl, haloalkyl, cycloalkyl, aryl, aralkyl, alkoxyalkyl, aryloxyalkyl, alkenyloxyalkyl, or alkenylaryloxyalkyl; each R" is any one of hydrogen, alkyl, alkenyl, haloalkyl, alkoxyalkyl, alkenyloxyalkyl or alkenylaryloxyalkyl; or any two of R' and R" can together form a cyclic structure; at least one of said R' and R" groups providing a hydrogen attached to a carbon in the beta position to S in each repeating monomer unit; $x$ is an integer of from 1 to 4; and $n$ is an integer having a value such that the number average molecular weight of the dithiol is between about 1,000 and 20,000, and preferably between about 1,200 and about 5,000. Where $x$ is greater than 1, each R' and R" can be the same or different in each repeating

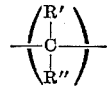

unit so that the repeating units can be alike or different. Similarly, in each repeating

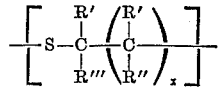

unit each R' and each R" can be the same as or different from those of the preceding or succeeding units. In the case of polythioether homopolymers, the repeating monomer units will, of course, be the same, but in the case of copolymers, the repeating monomer units can be different.

Exemplary of the polythioethers which can be cleaved to produce the products of this invention are homopolymers and copolymers of such cyclic sulfides as ethylene sulfide (thiirane), propylene sulfide, butene-1 sulfide, cis- and trans-butene-2 sulfide, isobutylene sulfide, isopropyl ethylene sulfide, tert-butyl ethylene sulfide, dodecene-1 sulfide, octadecene-1 sulfide, cyclohexene sulfide, chloromethyl ethylene sulfide, trifluoromethyl ethylene sulfide, tetramethyl ethylene sulfide, butadiene monosulfide, styrene sulfide, methoxymethyl ethylene sulfide, phenoxymethyl ethylene sulfide, allyloxymethyl ethylene sulfide, allylphenyloxymethyl ethylene sulfide, trimethylene sulfide (thietane), 2-methylthietane, 2,2-dimethylthietane, cis- and trans-2,4-dimethylthietane, 2- and 3-phenyl thietanes, 2 and 3-trifluoromethyl thietanes, 2- and 3-methoxymethyl thietanes, 7-thia-bicyclo [2·2·1] heptane, tetrahydrothiophene, 3-phenyl tetrahydrothiophene, pentamethylene sulfide, etc. In addition, polymers of thioaldehydes which have beta hydrogens can also be cleaved, as for example, poly(thioacetaldehyde), poly(thiopropionaldehyde), poly(thiobutyraldehyde), poly(thio-isobutyraldehyde), etc.

In additon to the copolymers of any two or more of the above monomers, copolymers which contain only part of the above required units can be used, provided that these units occur in sequences of at least 2, and preferably at least 5, and the remainder of the polymer is inert to the cleavage reaction. Exemplary of such polymers are graft copolymers such as vinyl alcohol polymers and copolymers, phenol-formaldehyde resins, etc., in which polymers the hydroxyls have been converted to polysulfide side chains; block copolymers such as blocks of hydrocarbon uints, polyester units and polyamide uints, or of polyethers, polysulfides or polyimines which do not have hydrogens beta to the ether, imine or S group, combined with blocks of units having the above formula. Such polymers are, for example, poly(vinyl alcohol) and copolymers of vinyl alcohol with ethylene (hydrolyzed vinyl acetate-ethylene copolymers) where each of the hydroxyl groups has been reacted with ethylene sulfide or propylene sulfide to give polyethioether side chains of 5 to 100 monomer units. The analogous products derived from soluble phenol-formaldehyde resins may also be cleaved in the same way, as can block copolymers such as copolymers of blocks of styrene with propylene sulfide blocks, blocks of ethylene terephthalate with ethylene sulfide blocks, blocks of formaldehyde with blocks of ethylene or propylene sulfide, blocks of thioformaldehyde with blocks of ethylene sulfide, etc.

Preferably, the polymer that is cleaved will be one of fairly high molecular weight so that the original end groups in the polymer being cleaved are an insignificant part of the total final end groups, and the major portion of the individual polymer molecules in the cleaved product will then have thiol end groups on both ends. The polymer being cleaved will preferably have a chain of at least about 100 of said monomer groups, and more preferably at least about 500. The actual molecular weight of the polymer being cleaved and the number of cleavages per polymer molecule desired will, of course, depend on the purpose for which the final polymer is to be used.

The high molecular weight polythioethers are readily cleaved by reacting the polymer with an organometallic compound of an alkali metal. The dithiols of this invention are obtained by treating the product of that cleavage with water or an aqueous acid to hydrolyze the alkali metal and ethylenically unsaturated end groups, respectively, to thiol groups.

The theory of this invention is illustrated by the following equations for the cleavage of poly(propylene sulfide) with an organolithium compound (LiR) wherein abstraction of hydrogens on a carbon atom beta to the thioether linkage leads to cleavage. As will be seen, there are, for any given thioether linkage in the polymer chain of poly(propylene sulfide), three positions wherein a hydrogen is attached to a carbon beta to the thioether linkage; hence, there are three possible chain cleavage reactions, two involving cleavage on the left side of the thioether linkage and one involving cleavage on the right side of the thioether linkage. The three cleavage reactions involving these three beta hydrogens ($\beta_1$, $\beta_2$ and $\beta_3$) are shown by Equations 1, 2 and 3 below. R represents the remainder of the polymer chain in these equations. Additionally, Equations 4 and 5 show the types of cleavage that can occur when more than one type of beta hydrogen and both left and right side cleavages are involved. Obviously, in any one cleavage reaction there will undoubtedly take place all of these various types of cleavages. Consequently, the end product will be a mixture of these cleavage products. As will be seen from these equations, under some conditions part of the end groups in the cleavage products contain double bonds, e.g., 1-propenyl in Product A, allyl in Product B, and isopropenyl in Product C. The 1-propenyl and isopropenyl end groups are readily hydrolyzed to thiol end groups by acid washing, as shown in Equations 9 and 10. The allyl end groups isomerize under the influence of the LiR' or LiSR present in the reaction mixture to 1-propenyl end groups which are readily converted to thiol end groups by acid hydrolysis. Under other conditions, e.g., with excess organometallic compounds, the double bond end groups can be cleaved to convert them directly to LiS-end groups, as shown by Equations 6, 7 and 8, and these LiS-end groups are readily converted to thiol end groups by water washing, as shown in Equation 11.

Left Side Cleavage

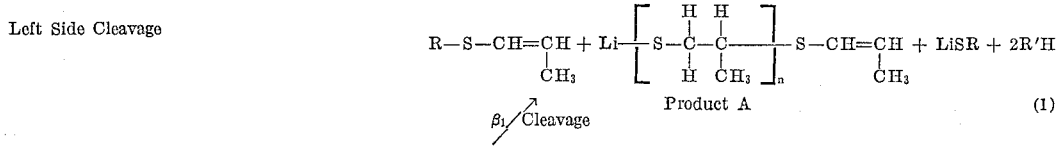

Product A (1)

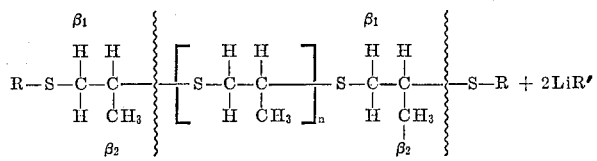

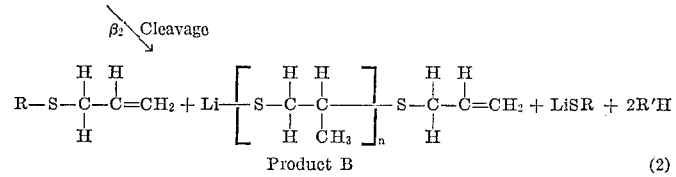

Product B (2)

Right Side Cleavage

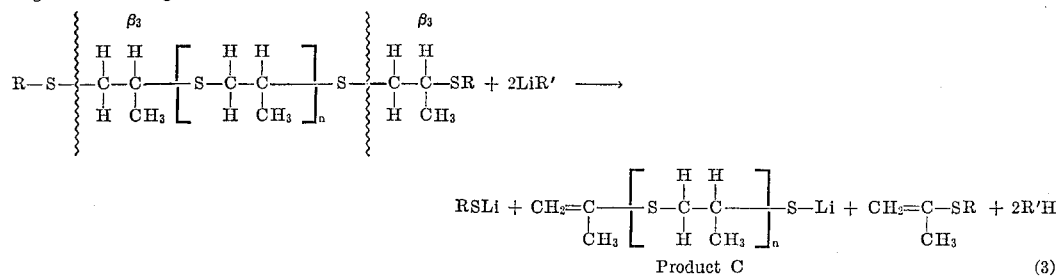

Product C (3)

Left Side and Right Side Cleavage Involving $\beta_1$ and $\beta_3$ Hydrogens

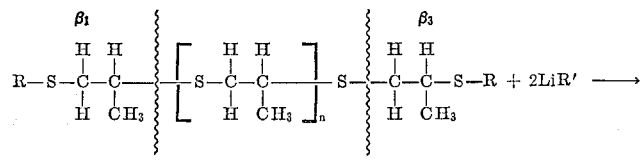

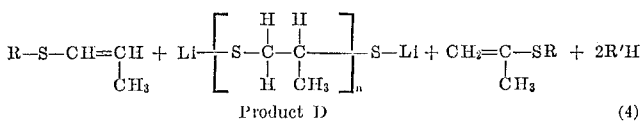

Product D (4)

Left Side and Right Side Cleavage
Involving $\beta_2$ and $\beta_3$ Hydrogens

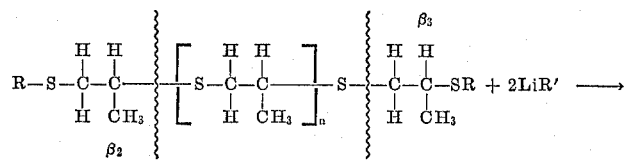

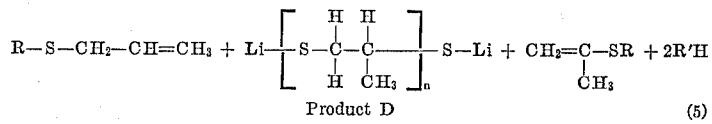

Product D (5)

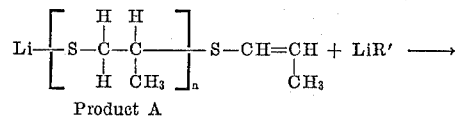

Product A

↑ Isomerizes

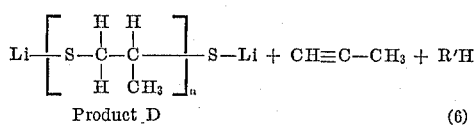

Product D (6)

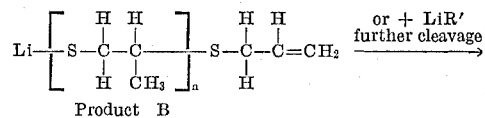

Product B

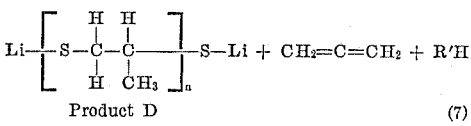

Product D (7)

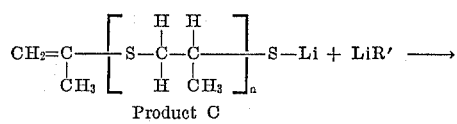

Product C

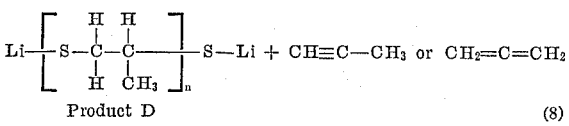

Product D (8)

Hydrolysis of Product A

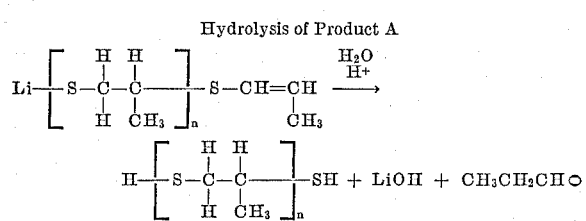

(9)

Hydrolysis of Product C

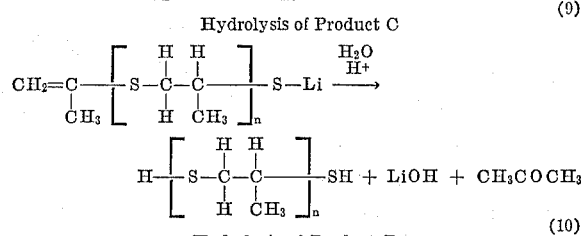

(10)

Hydrolysis of Product D

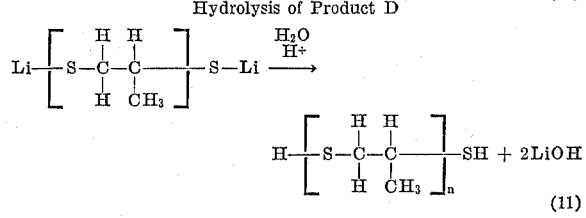

(11)

The cleavage reaction is carried out by reacting the polythioether with an organometallic compound of an alkali metal. Any organometallic compound of an alkali metal, i.e., lithium, sodium, potassium, rubidium or cesium, can be used. The organo moiety will preferably be a hydrocarbon group, as for example, an alkyl, aryl, alkenyl, alkynyl, cycloalkyl, cycloalkenyl, or aralkyl, etc., group. Exemplary of the alkali metal organometallic compounds that can be used are methyllithium, ethyllithium, isopropyllithium, n-butyllithium, isobutyllithium, tert-butyllithium, amyllithium, decyllithium, octadecyllithium, cyclohexyllithium, cyclohexenyllithium, phenyllithium, naphthyllithium, vinyllithium, lithium acetylide, methylsodium, ethylsodium, propylsodium, the butyl sodiums, isopropylsodium, amylsodium, dodecylsodium, benzylsodium, isopropenylsodium, allylsodium, octadecenylsodium, butadienylsodium, isoprenylsodium, butylrubidium, butylcesium, methyl-, ethyl-, propyl-, and butylpotassium, allylpotassium, octylpotassium, phenylpotassium, cyclopentylpotassium, cyclohexenylpotassium, etc. The amount of the organometallic compound used will depend upon the amount of cleavage desired, one molecule of the organometallic being required for each cleavage, i.e., per two chain ends. Thus, the amount of organometallic compound can vary from about 1% up to a large excess, as for example, 5 to 10 times the weight of the polymer being cleaved, but preferably will vary from about 1% to about 100% by weight of the polymer being cleaved.

The cleavage reaction can be carried out in the absence of a diluent, i.e., in a bulk process, but preferably is carried out in a diluent which may be a solvent for the polymer being cleaved, or which may serve only as a dispersant for the polymer. Any organic liquid diluent that is inert under the reaction conditions can be used, as for example, aromatic hydrocarbons such as benzene, toluene, xylene, etc., aliphatic and cycloaliphatic hydrocarbons such as hexane, n-heptane, cyclohexane, etc., and mixtures of such hydrocarbons, as for example, petroleum ether, gasoline, etc. Diluents that are capable of reaction with the organometallic compound or other cleaving agent, as for example, ethers, can also be used, provided the rate of reaction of cleaving agent with the polymer being cleaved exceeds the rate of reaction with the diluent.

The concentration of the polymer in the diluent can vary from about 1% up to an essentially diluent-free system. As already mentioned, the polymer can be dissolved in the diluent or a slurry of the polymer in the diluent can be used. Generally, it is preferred to use conditions such that the polymer solution or dispersion is stirrable. Usually the polymer concentration will be in the 2 to 50% range. As noted above, the process can be operated in the absence of a diluent, particularly in the case of polymers which, on cleavage, become more and more fluid, or by carrying out the process in an extruder, after which the cleaved fluid product can be handled in more conventional equipment in a continuous process.

The cleavage reaction can be carried out over a wide temperature range, generally from about $-50°$ C. to about $200°$ C., depending on the reactivity of the polymer and the cleaving agent, the stability of the cleaving agent, etc. Preferably, the reaction is carried out at a temperature of from about $-20°$ C. to about $150°$ C., and more preferably between about $0°$ C. and about $125°$ C. The pressure at which the reaction is carried out can be atmospheric, subatmospheric or above atmospheric, as desired. In fact, pressures up to several thousand p.s.i. can be used if needed to keep the diluent in the liquid state.

The high molecular weight polythioethers which are cleaved to prepare the product of this invention can be prepared by any desired means. Thus, these polythioethers are readily prepared by using as the polymerization catalyst an organoaluminum or organozinc compound reacted with water, and preferably with both water and a chelating agent. A typical catalyst preparation is carried out by reacting a solution of the organozinc compound, as for example, diethylzinc, in a mixture of n-heptane and ether as solvent, with 0.9 mole of water per mole of zinc, and agitating the mixture at $30°$ C. for 16 to 20 hours. The polymerization is typically carried out by injecting the catalyst solution so prepared into a solution of the polythioether in an inert diluent and agitating the mixture at room temperature or at elevated temperatures for several hours. Alternatively, certain modified organomagnesium catalysts can be used to prepare these high molecular weight polythioethers. For example, a dialkylmagnesium reacted with an activating agent such as ammonia, ethylenediamine, diethylenetriamine, etc., can be used as the catalyst. Suitable dialkylmagnesiums that can be so reacted and used are diethylmagnesium, dibutylmagnesium, dioctylmagnesium, etc. Using this procedure, the polymerization is generally carried out at a temperature within the range of $-30°$ C. to $100°$ C. The method used to isolate the polymer will depend on the solubility of the polymer in the reaction diluent, etc. Preparation of the high molecular weight polythioethers will be further illustrated in the following specific examples.

The high molecular weight polymer to be cleaved can be isolated from the polymerization reaction vessel prior to the initiation of cleavage, or the cleavage reaction can be commenced in the same vessel in which the polymerization is effected without any such isolation.

To produce the dithiols of polythioethers of this invention, the reaction product of the above-described cleavage reaction must be treated to convert the alkali metal salts to thiol groups. This can be easily accomplished by simply washing the reaction mixture with water (basic, neutral or acidic) or with a weak acid solution (aqueous or nonaqueous), as for example, dilute hydrochloric, formic, acetic, oxalic, sulfuric, sulfurous, nitric, sulfonic or carbonic acids or the like. With the aqueous acid treatment, any 1-propenyl, isopropenyl, etc., end groups are hydrolyzed to the corresponding thiol end groups.

The thiol-ended polymers of this invention can be prepared in a wide variety of molecular weights, depending on the molecular weight of the starting polymer and the amount of cleavage to which it is subjected. In general, they are prepared with a number average molecular weight of from about 1,000 to about 20,000, and preferably of from about 1,200 to about 5,000. These products are dithiols, having a terminal thiol group on both ends of the polymer chain. The polymeric thiols of this invention can be either crystalline or amorphous, depending on the structure of the high polymer prior to cleavage, and can be solid or liquid, depending on their crystallinity and molecular weight. Generally, those amorphous dithiols of this invention having molecular weights between about 1,000 and about 5,000 are liquid polymers, while those amorphous dithiol polymers having molecular weights between about 5,000 and about 20,000 are solid polymers. The crystalline dithiols are solids at all molecular weights.

Because the dithiol products of this invention have thiol groups at each end of their polymer chains, they can be used in various chain extension reactions. The chain extending agents can be any polyfunctional compounds which react under appropriate temperature, pressure and catalyst conditions with the hydroxyl groups. They can be di- or polyisocyanates such as m- or p-phenylene diisocyanate, 2,4-toluene diisocyanate, 1,5-naphthyl diisocyanate, methylene di(p-phenyl diisocyanate), hexamethylene diisocyanate, triphenyl methane triisocyanate, etc., di- or polyepoxides such as Epon resins, as for example, the diglycidyl ether of Bis Phenol-A, or di- or triaziridines, as for example tris[1-(2-methyl) aziridinyl] phosphine oxide, tris(1-aziridinyl) phosphine oxide, or di- or polyanhydrides such as pyromellitic anhydride, or di- or polyimides such as phenylene bis-maleimide, etc. The difunctional chain extending agents are generally used in approximately stoichiometric amounts to the active chain ends when a linear, soluble high polymer product is desired. When the chain extending agent contains more than two functional groups and is used in approximately stoichiometric amounts to the active chain ends, the product is generally a cross-linked product. Alternatively, a cross-linked network can be obtained by using a combination of a difunctional active chain end polymer with low molecular weight polyreactive compounds. For example, a combination of the dithiols of this invention with a polymercaptan such as 1,2,3-trimercapto-propane, trimercaptomethylpropane, tetra-kis(N - mercaptoethyl) ethylenediamine, etc., or glycerine, pentaerythritol, trimethylolpropane, sorbitol, tetrakis(2-hydroxypropyl) ethylenediamine, etc., in combination with the diisocyanate will yield a cross-linked polyurethane type network.

This invention provides entirely new polythioethers with thiol(mercapto) groups at both ends. The crystalline or crystallizable active chain end polymers of this type, which can be produced, are especially unique and desirable. They contribute the desirable properties inherent in crystalline polymers, a for example, hardness, toughness, solvent resistance, etc., to many fields where the prior art high molecular weight crystalline polymers could not be used because of fabrication, adhesion or application difficulties. These materials are very useful for coatings (urethane type, melamine-fomaldehyde type, alkyds); foams (rigid, semi-rigid, and elastomeric); cast articles (rigid and elastomeric); as vulcanizable elastomers; elastomeric fibers, adhesives, films, potting resins, injection molded articles, etc.

The new thiol(mercapto) ended polymers of this invention, produced by cleavage of polythioethers (polysulfides) such as poly(trimethylene sulfide) and poly(propylene sulfide) are very useful as modifiers and flexibilizers for Epon resins in the preparation of cast articles, coatings, sealants, laminates, adhesives, etc. These dimercaptans can be chain extended by oxidation to form a unique polymeric sulfide joined by disulfide links. This oxidation can be accomplished by means of air, iodine, lead dioxide, manganese dioxide, chlorates, perchlorates, peroxides such as cumene hydroperoxide, etc. Such oxidation products used for coatings, for cast articles, for sealants, laminates, adhesives, etc., have excellent weathering stability and good solvent resistance. Chain extension of these dimercaptans can also be accomplished with appropriate metal salts, zinc oxide, lead oxide, and cadmium oxide, etc. Other agents which are useful for chain extending and/or cross-linking these dimercaptan-ended polymers and di- and polyisocyanate, reactive phenols or phenol formaldehyde resins, diepoxy resins, organic titanates, organic nitro compounds, quinone di-oxime, etc. These dithiol-ended polysulfide polymers are superior to the conventional polysulfide polymers in that they have better hydrolytic and oxidative stability due to the absence of the reactive formal and reactive disulfide groups present in large amounts in most commercial polysulfide polymers. The cleavage products from poly(trimethylene sulfide) are especially useful because of their crystallinity, which leads to tougher, harder products and because of their inherent low temperature properties. The cleavage products from amorphous poly(propylene sulfide) and amorphous ethylene sulfide-propylene sulfide copolymers are outstandingly superior to conventional polysulfides because, while retaining their very useful liquid properties for ease of fabrication, they are more stable to hydrolysis, oxidation and heat.

Still further uses for the new dithiol polythioethers of this invention will be readily apparent to those skilled in the art from the foregoing disclosure.

The following examples illustrate the preparation of the new products of this invention. All parts and percentages are by weight unless otherwise indicated. All examples were run under a nitrogen atmosphere. The molecular weight of the polymers is indicated by their reduced specific viscosities (RSV). By the term "Reduced Specific Viscosity" is meant that $\eta_{sp/c}$ determined on a 0.1% solution in chloroform at 25° C. unless otherwise indicated. The number average molecular weight (Mn) was determined in benzene (heating to dissolve the polymer when necessary) using a Mechrolab osmometer. The calculated Mn was calculated from the thiol analysis assuming two thiol groups per chain. Thiol analysis was determined by iodine titration and/or Zerewitinoff analysis. Where the melting point of the polymer is given, it was determined by differential thermal analysis (DTA).

The terms "polythioether" and "polysulfide" are used interchangeably herein, as are the terms "thiol" and "mercaptan" or "mercapto."

EXAMPLE 1

Trimethylene sulfide (29.5 parts) was polymerized at 30° C. for 139 hours, using a total of 2.7 parts of diethylzinc which had been reacted with 0.9 mole of water in 28 parts of a 77:23 mixture of ether and n-heptane, the catalyst being added in two equal parts at 0 and 94 hours. After stopping the reaction by adding 12 parts of anhydrous ethanol, the reaction mixture was washed twice with 3% aqueous hydrogen chloride, washed neutral with water, washed once with a 2% aqueous solution of sodium bicarbonate and again washed neutral with water. The ether-insoluble polymer recovered was washed twice with ether and then once with ether containing 0.05% of phenyl-β-naphthylamine as stabilizer, after which it was dried for 16 hours at 80° C. under vacuum. The polymer was obtained in a 36% conversion, and it was a crystalline polymer having an RSV of 3.3.

One part of the poly(trimethylene sulfide) so prepared was disolved in 84 parts of anhydrous benzene by heating the mixture at 120° C. The solution was centrifuged while hot to remove some insoluble catalyst residue. The supernatant was then stirred at 69° C., and 0.80 part of lithium butyl was added. After 15 minutes, the reaction was stopped by adding 1.6 parts of anhydrous ethanol. The reaction mixture was then allowed to stand for 3 days at room temperature, after which it was washed with 50 ml. of a 10% aqueous solution of hydrogen chloride, and washed neutral with water. An insoluble fraction was collected, washed once with benzene and then with 0.005% phenyl-β-naphthylamine in benzene. After drying, there was obtained a tough, hard solid (0.3 part) which had an RSV of 1.7. The molecular weight was too high to determine the end groups. The benzene-soluble product was recovered by evaporation and drying. It amounted to 0.5 part and was a hard, brittle film having an RSV of 0.49 and an Mn of 3678.

EXAMPLE 2

One part of the poly(trimethylene sulfide) prepared in Example 1, but which had been purified and dried and had an RSV of 3.0, was dissolved in 84 parts of anhydrous benzene by heating at 90° C. After cooling to 70° C. and with stirring, 1.15 parts of lithium butyl was added. The reaction mixture was then stirred for 4 hours at 75° C., after which the reaction was stopped by adding 1.6 parts of anhydrous ethanol. The reaction mixture was washed at room temperature with 50 ml. of a 10% aqueous solution of hydrogen chloride (stirred for 30 minutes), washed neutral with water, filtered, evaporated and dried. The product so obtained was a hard, waxy solid (it was a viscous liquid at 80° C.) and amounted to 0.94 part (94% yield). It had an RSV of 0.16 and an Mn of 1745.

EXAMPLE 3

Propylene sulfide, 5.6 parts, was polymerized under nitrogen with diethylzinc which had been reacted with 0.9 mole of water as catalyst (as described in Example 1), polymerization taking place at room temperature for 19 hours. The polymerization was shortstopped by adding 2 parts of anhydrous ethanol. The reaction mixture was dispersed in ether and was washed twice with 3% aqueous hydrogen chloride, washed neutral with water, washed once with 2% aqueous sodium bicarbonate solution and again washed neutral with water. The ether-insoluble product was collected, washed twice with ether and once with 0.01% of Santonox in ether, after which it was dried for 16 hours at 80° C. under vacuum. The product was obtained in a 95% conversion and was a snappy rubber with an RSV of 1.5 and was shown to be amorphous by X-ray.

One part of the above poly(propylene sulfide) was dissolved in 44 parts of anhydrous benzene under nitrogen. With stirring there was added at 30° C., 0.19 part of lithium butyl in 1.2 parts of n-hexane. There was a gradual decrease in viscosity. After 2.2 hours, the reaction was stopped by adding 0.4 part of anhydrous ethanol. The reaction mixture was then stirred for 15 minutes with 10% aqueous hydrogen chloride, washed neutral with water, filtered, stripped, and dried for 16 hours at 80° C. under vacuum. The product so obtained amounted to 0.88 part and was a viscous liquid with an Mn of 1381. Analysis for percent SH end groups by iodine titration in chlorobenzene showed 4.9% present. The Mn calculated from this percent SH, assuming 2 SH per chain, was 1350.

EXAMPLE 4

Fifty (50) parts of propylene sulfide in 242 parts of anhydrous toluene was treated under nitrogen at 30° C. with 0.60 part of diethylzinc which had been reacted with 0.9 mole of water as described in Example 1. After 19 hours of polymerization at 30° C., the reaction was short-stopped by adding 20 parts of anhydrous ethanol. The reaction mixture was diluted with toluene, and the reaction mixture was washed with aqueous hydrogen chloride, water, and aqueous sodium bicarbonate, as described in Example 2. The product was soluble in the solvent, and, after stabilization by adding 0.1% phenyl-$\beta$-naphthylamine, it was recovered by evaporation and dried for 16 hours at 80° C. under vacuum. The polymer was obtained in a 100% conversion, had an RSV of 3.4 and contained less than 0.05% SH (iodine titration in chlorobenzene).

Twenty-five (25) parts of this poly(propylene sulfide) was dissolved in 1100 parts of anhydrous benzene under nitrogen. Then while stirring at 30° C., 4.8 parts of lithium butyl in 30 parts of n-hexane was added. After stirring for 2.2 hours at 30 to 25° C., the reaction was stopped by adding 10 parts of anhydrous ethanol. After 5 minutes, 625 ml. of a 10% aqueous solution of hydrogen chloride was added, and the temperature was raised to 60° C. and held there for 1.5 hours. The mixture was then cooled and washed neutral with water, filtered, evaporated and the product dried for 16 hours at 80° C. under vacuum to yield 24.8 parts of a viscous liquid having an RSV of 0.12 and an Mn of 1316. Analysis showed it to contain 5.8% SH by iodine titration in chlorobenzene. The Mn calculated from percent SH and based on 2 SH per chain was 1140.

This product was tested as a flexibilizer for a bis-Phenol-A-Epon resin in a weight ratio of 1:2, respectively, and found to be more effective in reducing modulus than a commercially used polysulfide flexibilizer.

EXAMPLE 5

Ninety (90) parts of propylene sulfide and 10 parts of ethylene sulfide were mixed under nitrogen with 390 parts of dry toluene and, after equilibrating at 30° C., there was added diethylmagnesium which had been reacted with 0.4 mole of ammonia per mole of magnesium. The catalyst was prepared by reacting 40 ml. of a 0.5 M solution of diethylmagnesium in ether in a closed vessel containing 0.14 part of ammonia and some glass beads, tumbling the mixture for 18 hours at 30° C., and then for 19 hours at 90° C. After 2 hours at 30° C., the polymerization was stopped by adding 40 parts of anhydrous ethanol. The reaction mixture was diluted with 2 volumes of ether, stirred twice for 2 hours with 10% aqueous HCl and then washed neutral with water. The ether-insoluble polymer was collected, washed twice with ether, once with ether containing 0.1% of an antioxidant, and finally was dried for 16 hours at 80° C. under vacuum, to yield 6.0 parts of a tough rubber. This product was then agitated two days with 300 ml. of benzene, the insoluble was separated and washed with benzene. The benzene-soluble product was recovered by distilling off the solvent and drying it for 16 hours at 80° C. under vacuum. It amounted to 3.9 parts and was a snappy rubber, which was shown to be amorphous by X-ray. It was found to contain 22% ethylene sulfide, based on sulfur analysis, and had an RSV of 1.9.

Two (2) parts of this benzene-soluble ethylene sulfide—propylene sulfide copolymer was dissolved under nitrogen with 88 parts of dry benzene. Then, while stirring at 30° C., 0.20 part of butyllithium in 1.2 parts of n-hexane was added. After 2.2 hours the viscosity was greatly reduced and 0.8 part of anhydrous ethanol was added to stop the reaction. The reaction mixture was stirred with 50 parts of 10% aqueous HCl, washed neutral with water, and filtered. The solvent was removed from the liquid phase under vacuum, and the residue was dried for 16 hours at 80° C. under vacuum. The dithiol so obtained was a viscous liquid amounting to 1.91 parts. The percent SH found by iodine titration in chloroform was 2.86%.

EXAMPLE 6

The poly(propylene sulfide) used in this example was prepared by polymerizing propylene sulfide for 19 hours at 25° C., using as the catalyst diethylmagnesium which had been reacted in ether solution at 0° C. with one mole of water per mole of magnesium. The polymer was isolated and purified by recrystallization from toluene. It had an RSV of 3.0 (measured on a 0.04% solution in chloroform at 25° C.), was crystalline by X-ray and had a melting point of 73° C.

One part of this crystalline poly(propylene sulfide) was cleaved following the procedure described in Example 3, except that 0.12 part of tert-butyllithium in 0.7 part of n-hexane was used. The dithiol so produced amounted to 0.95 part and was a soft, waxy, crystalline solid having a melting point of 55° C. and containing 2.8% SH groups. The Mn calculated was 2360 and found was 2250.

EXAMPLE 7

The crystalline poly(cis-2-butene episulfide) used in this example was prepared by polymerizing cis-2-butene episulfide with, as catalyst, diethylmagnesium that had been reacted with 0.8 mole of ammonia per mole of magnesium. The catalyst preparation was carried out by mixing the two reactants in ether at 0° C. and then agitating the mixture at 30° C. for 20 hours. The polymerization was carried out at 30° C. for 19 hours. The polymer was isolated by diluting the reaction mixture with toluene, then stirring it twice with 10% aqueous HCl for 2 hours, washing it neutral with water, then with a 2% aqueous solution of sodium bicarbonate and again washing with water until neutral. The toluene-insoluble polymer was separated, washed with toluene, and finally was dried. It was crystalline by X-ray, had a melting point of 155° C. and an RSV of 0.93 (0.1% solution in tetrachloroethane at 100° C.). The toluene-soluble polymer was isolated and was crystalline by X-ray, had a melting point of 149° C., and an RSV of 0.66 (0.1% solution in tetrachloroethane at 100° C.).

One part of the toluene-insoluble poly(cis-2-butene episulfide) was cleaved following the procedure of Example 3 except that toluene was used as the diluent instead of benzene and the polymer and toluene were heated to about 150° C. to dissolve, after which the solution was cooled to 30° C. and 0.15 part of sec-butyllithium in 1.0 part of n-hexane was added. The dithiol so produced amounted to 0.90 part and was a white crystalline solid, having a melting point of 130° C. and an SH content of 3.9%. The Mn calculated was 1700 and found was 1620.

EXAMPLE 8

The crystalline poly(isobutylene sulfide) used in this example was prepared by polymerizing isobutylene sulfide with, as catalyst, diethylmagnesium that had been reacted with 0.8 mole of ammonia per mole of magnesium, as described in Example 7. The polymerization reaction was carried out at 30° C. for 19 hours, after which ether was added to dilute the reaction mixture and the polymer was isolated by stirring the mixture twice for 2 hours with 10% aqueous HCl, washing neutral with water, washing with 2% aqueous solution of sodium bicarbonate, and again washing neutral with water. The ether-insoluble poly(isobutylene sulfide) was separated, washed twice with ether, once with a 0.4% solution of an antioxidant and dried. The polymer so obtained was white powder, crystalline by X-ray diffraction analysis, had a melting point of 187° C., and had an RSV of 1.24 (0.1% solution in tetrachloroethane at 100° C.).

One part of this crystalline poly(isoybutylene sulfide) was cleaved by the procedure described in Example 7, except that double the amount of sec-butyllithium was used. The dithiol so produced amounted to 0.88 part, was a white, crystalline solid, having a melting point of 160° C. and an SH content of 4.8%. The Mn calculated was 1380 and found was 1290.

EXAMPLE 9

The poly(trans-2-butene episulfide) used in this example was prepared by the same procedure used for polymerizing cis-2-butene episulfide described in Example 7, except that in the isolation of the polymer the reaction mixture was diluted with ether and the ether-insoluble polymer was isolated. The ether-insoluble poly-(trans-2-butene episulfide) so obtained was crystalline by X-ray, had a melting point of 118° C. and an RSV of 0.44 (0.05% solution in chloroform at 25° C.).

This crystalline poly(trans-2-butene episulfide) was cleaved by the process described in Example 7. The dithiol so obtained was a white crystalline solid having a melting point of about 95° C.

EXAMPLE 10

A high molecular weight, amorphous poly(butene-1-sulfide) was prepared and cleaved by the process described in Example 3, except that butene-1-sulfide was substituted for the propylene sulfide used in that example. The dithiol so produced amounted to 0.90 part and was a viscous liquid with an SH content of 4.7%. The Mn calculated was 1410 and found was 1480.

What I claim and desire to protect by Letters Patent is:

1. As a new composition of matter, a dithiol of a polythioether, said dithiol having the formula:

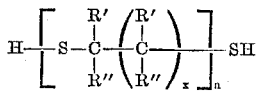

where each R' is selected from the group consisting of hydrogen, alkyl groups containing 1 to 16 carbon atoms, ethenyl, halomethyl, cyclohexyl, phenyl, phenylmethyl, methoxymethyl, phenoxymethyl, allyloxymethy, and allylphenyloxymethyl; each R'' is selected from the group consisting of hydrogen, alkyl groups containing 1 to 16 carbon atoms, ethenyl, halomethyl, methoxymethyl, allyloxymethyl and allylphenyloxymethyl; and any two of R' and R'' can together form a cyclic structure; at least one of said R' and R'' groups providing a hydrogen attached to a carbon beta to S; $x$ is an integer from 1 to 4 and $n$ is an integer having a value such that said dithiol has a number average molecular weight between about 1,000 and about 20,000.

2. he composition of claim 1 wherein said dithiol is a solid, crystalline polymer having a number average moleucular weight between about 1,200 and about 5,000.

3. The composition of claim 1 wherein said dithiol is a liquid, amorphous polymer having a number average molecular weight between about 1,200 and about 5,000.

4. The composition of claim 1 wherein R' and R'' are each hydrogen and $x$ is 2.

5. The composition of claim 1 wherein the dithiol has the formula

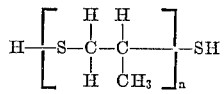

6. The composition of claim 1 wherein the dithiol has the formula

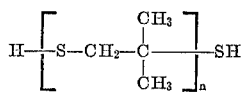

7. The composition of claim 1 wherein the dithiol has the formula

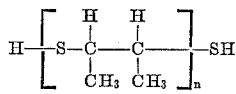

8. The composition of claim 5 where the dithiol is crystalline.

References Cited

UNITED STATES PATENTS

| | | | |
|---|---|---|---|
| 3,325,456 | 6/1967 | Adamek et al. | 260—79.7 |
| 3,365,431 | 1/1968 | Gobran et al. | 260—79.7 |
| 3,384,671 | 5/1968 | Louthan | 260—609 |

DONALD E. CZAJA, Primary Examiner

M. I. MARQUIS, Assistant Examiner

U.S. Cl. X.R.

117—161; 260—79.7, 609, 775, 830